No. 867,553. PATENTED OCT. 1, 1907.
C. S. BRADLEY.
APPARATUS FOR TREATING GASES WITH LIQUIDS AND LIQUIDS WITH GASES.
APPLICATION FILED JUNE 5, 1905.
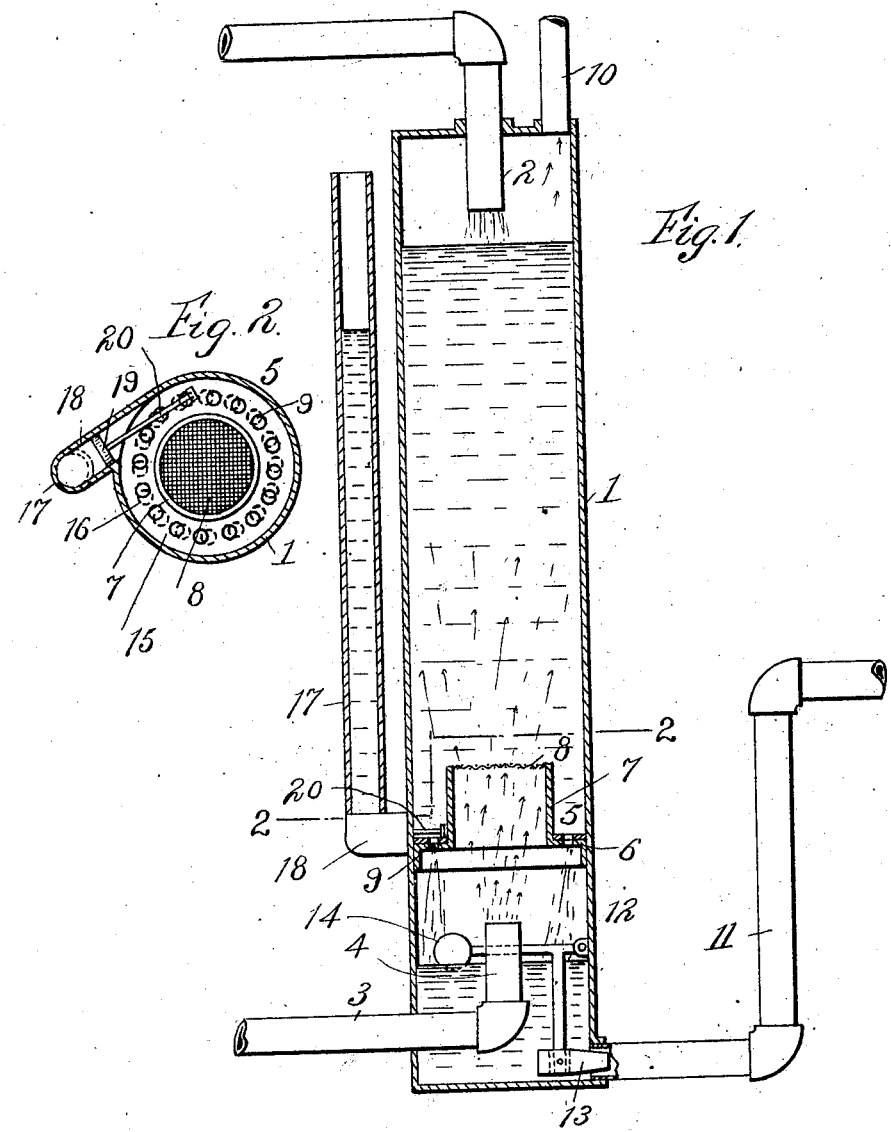

UNITED STATES PATENT OFFICE.

CHARLES S. BRADLEY, OF NEW YORK, N. Y.

APPARATUS FOR TREATING GASES WITH LIQUIDS AND LIQUIDS WITH GASES.

No. 867,553.  Specification of Letters Patent.  Patented Oct. 1, 1907.

Application filed June 5, 1905. Serial No. 263,818.

*To all whom it may concern:*

Be it known that I, CHARLES S. BRADLEY, a citizen of the United States, and a resident of the borough of Manhattan, city and State of New York, have invented certain new and useful Improvements in Apparatus for Treating Gases with Liquids and Liquids with Gases, of which the following is a specification.

My invention has directly for object an apparatus wherein water may be subjected to the purifying action of ozone or ozonized air and I shall herein describe the apparatus with special reference to that use. But it will be obvious that the apparatus is of much wider applicability,—as, to other liquids and gases,—and that its function, in some applications, may be the treatment of a gas by subjecting it to intimate contact with a liquid, instead of the contrary function herein particularly described.

In subjecting water to the action of ozonized air, it is important that the distribution of the air throughout the water be thorough—so that no impurity in the water will escape the oxidizing contact of the ozone; that the operation be continuous and, if need be, rapid; that the air, rendered impure by its action upon the water impurities, be separated out from the water, and that the action of the apparatus shall, by automatically operating means, be maintained at all times constant. To attain these desirable objects I have devised a form of ozonizing tower which I will first fully describe with reference to the accompanying drawings before proceeding to point out in the claims the novel elements and combinations.

In said drawings: Figure 1 is a sectional elevation of a water ozonizing tower embodying my improvements. Fig. 2 is a transverse sectional view on a plane indicated by the line 2—2 Fig. 1.

The tower comprises the casing or pipe 1 into which water to be purified is introduced at the top or upper part of the casing, as by a pipe 2 suitably connected with the main or source of water supply. The height of the tower and of the water column therein, as well as the pressure employed in the system, will vary with conditions of ozone generating apparatus and quantity and purity of the water supply, and the proportions here shown may be simply regarded as illustrative.
The ozone or ozonized air to be employed in purifying the water is introduced under pressure at the lower part of the tower through the pipe 3 which has within the tower an upturned end or nozzle 4, preferably located in the exact center of the tower and discharging the ozonized air, therefore, in a stream equidistant from the walls of the tower. Arranged transversely in the tower at a suitable point below its upper end, to insure that the water shall have sufficient treatment with the ozone before being discharged, I arrange a diaphragm 5 which has the annular horizontal portion 6, the vertical neck 7, and the circular horizontal portion 8. The annular portion 6 has perforations 9 to permit the ozonized water to flow through the diaphragm, while the portion 8 is a screen having very minute apertures or perforations to permit the ozonized air to pass through it into the water in the upper part of the tower. The neck 7 is made of such height as to allow such difference between the head of water on the screen 8 and on the annular part 6 of the diaphragm as to insure the flow of the water through apertures 9 in the annular part 6 instead of through the screen 8. The very fine division of the surface of screen 8 also, while permitting the passage of ozonized air and insuring its distribution throughout the body of water, will prevent the passage of the water. The ozonized air passing up in the water tower 1 will subject to its oxidizing action all of the impurities therein and then escapes or is led off through the pipe or outlet 10 at top of the tower.

After passing through the annular part 6 of the diaphragm the water flows out at the bottom of the tower through the delivery pipe 11 which is, preferably, as shown, led up to a point sufficiently above the bottom of the tower to water-seal the outlet and prevent the escape of the ozonized air. There is also thus afforded between the surface of the water in the lower part of the tower and the diaphragm 5 a chamber 12 in which the water will set free any air which has been carried down with it. The air in the chamber 12 being at the same pressure as that issuing from the inlet 4 will be again carried with the latter up through the screen 8 and so again be brought in contact with the descending water in the tower above the diaphragm.

To maintain the constancy of the depth of water in the chamber 12 I place in the outlet 11 a valve 13 controlled by the float 14 resting on the water in said chamber, so that when the depth of said water increases the valve will open the outlet allowing the water to be more quickly discharged, and on decrease of depth of the water, a contrary movement of the valve takes place, partly or entirely closing the outlet.

It is desirable that the depth of water over the diaphragm 5 be maintained constant, to secure completeness and equality of ozonizing effect. To maintain a constant head of water at this point therefore, I arrange to regulate the outflow of the water through the diaphragm in harmony with the inflow of the water at the top of the tower. As a convenient way of accomplishing this I may, as shown in the drawings, place over the part 6 of the diaphragm a ring 15 having holes 16 which may be brought in line with those in the part 6, entirely or partially, and thus regulate the extent of resistance to the passage of the water through the diaphragm. To automatically adjust this ring in harmony with the speed of the water supply I may arrange at the side of the tower a standpipe 17 having the cylindrical horizontal portion 18 connected with the tower immediately above the part 6 of the diaphragm.

In the said horizontal portion is arranged a piston 19 connected by the rod 20 with the ring 15. Sufficient water is placed in the standpipe 15 to force the piston inward against the resistance of the column of water in the tower above the diaphragm if the said column should fall below the proper normal height and thereby close to a greater or less extent the apertures in the part 6 of the diaphragm should the head of water in the tower above the diaphragm diminish owing to the falling off of the supply.

It is obvious that many modifications may be made in my invention without departing from its essential elements hereinafter claimed, and I therefore, do not wish to be considered as limiting myself to the exact details of construction or exact application of the invention herein shown and described.

Having thus described the invention what I claim as new and desire to secure by Letters Patent is:—

1. In apparatus of the character described, the combination with a chamber adapted to contain a liquid, and a chamber adapted to contain a gas; of a gas communication from the gas chamber to the liquid chamber, a liquid communication from the liquid chamber to the gas chamber, and means for maintaining the liquid pressure on the liquid communication above the gas pressure and on the gas communication below the gas pressure.

2. In apparatus of the character described, the combination with a tower adapted to contain a body of liquid above and gas under pressure below, and an intermediate transverse partition having two perforated portions at different depths in said body of liquid, and means for maintaining the liquid-pressure on the lower perforated portion of said partition above the pressure of said gas, and on the upper perforated portion thereof below the pressure of said gas.

3. In apparatus of the character described, the combination with a vessel adapted to contain a body of liquid above and gas under pressure below, and an intermediate transverse partition adapted to support said body of liquid; of means of communication from the space below said partition into said body of liquid at a lesser depth in said liquid, means of communication from above said partition into said gas at a greater depth in said liquid, and means controlled by the depth of the liquid above said partition for maintaining the pressure on the communication of lesser depth below that of the gas and a pressure on the communication of greater depth above that of the gas.

4. In apparatus of the character described, the combination with a vessel provided with a chamber adapted to contain a body of liquid and a chamber adapted to contain a gas under pressure; of means of communication from the gas chamber into said body of liquid at a lesser depth in said body of liquid, means of communication from said body of liquid into said gas chamber at a greater depth in said body of liquid, and means controlled by the depth of liquid for maintaining the pressure on the communication of lesser depth lower than the gas pressure and on the communication of greater depth higher than the gas pressure.

5. In apparatus of the character described, the combination of a tower having an inlet for liquid at its upper portion, an inlet for gas at its lower portion, a diaphragm having an apertured portion for the passage of gas, and means for regulating the passage of liquid through said diaphragm controlled by the height of liquid above the diaphragm.

6. In apparatus of the character described, the combination of a tower having a perforated diaphragm, means for supplying liquid above said diaphragm and gas below it, and means for controlling the passage of liquid through said diaphragm controlled by the liquid above the diaphragm.

CHARLES S. BRADLEY.

Witnesses:
ELIAS GOLDBERG,
P. F. SONNEK.